United States Patent [19]

Cella et al.

[11] 4,176,112

[45] Nov. 27, 1979

[54] MOISTURE CURABLE ALKOXY ORGANOPOLYSILOXANES

[75] Inventors: James A. Cella, Clifton Park; Tyrone D. Mitchell, Albany, both of N.Y.

[73] Assignee: General Electric Company, Schenectady, N.Y.

[21] Appl. No.: 927,284

[22] Filed: Jul. 24, 1978

[51] Int. Cl.² ............................................. C08L 83/06
[52] U.S. Cl. ............................. 260/37 SB; 260/18 S; 528/18; 528/29; 528/32; 528/34; 528/40; 528/901
[58] Field of Search ................ 528/34, 40, 29, 32, 528/18, 901; 260/37 SB

[56] References Cited

U.S. PATENT DOCUMENTS

| | | | |
|---|---|---|---|
| 3,344,104 | 9/1967 | Hyde | 528/34 |
| 3,922,307 | 11/1975 | Müller | 260/586 C |
| 4,012,375 | 3/1977 | Hahn | 528/34 |

OTHER PUBLICATIONS

Torkelson et al., Synthesis, pp. 722–724 (1976).
Hengge et al., Monatschift fur Chemie, Darstellung und Umlagerung von Silylsubstituieren Ketoenolen, vol. 104, pp. 1071–1076, (1973).
Organic Synthesis, 5,5–Dimethyl–1,3–cyclohexanedione, pp. 200–202.

*Primary Examiner*—Melvyn I. Marquis
*Attorney, Agent, or Firm*—William A. Teoli; Joseph T. Cohen

[57] ABSTRACT

Alkoxy substituted 1,3-dicarbonyl silyl ethers have been found to produce moisture curable organopolysiloxane compositions having optimum cure characteristics when such silyl ethers are utilized with silanol containing organopolysiloxanes. The moisture curable organopolysiloxane compositions can be used as adhesives, sealants and caulking compounds.

5 Claims, No Drawings

MOISTURE CURABLE ALKOXY ORGANOPOLYSILOXANES

BACKGROUND OF THE INVENTION

The present invention relates to moisture curable organopolysiloxanes having terminal 1,3-dicarbonyl cyclic alkoxyorganosiloxy units.

Prior to the present invention, one-package moisture curable organopolysiloxane compositions consisting essentially of chemically combined units of the formula,

(1)

where R is a monovalent organic radical, generally had an organo silyl functional unit sensitive to atmospheric moisture, such as silylacyloxy unit, a silylketoximato unit, silylaminoxy unit, etc. These moisture sensitive organopolysiloxane compositions were generally maintained as a pigmented moisture-free reinforced mixture in a moisture resistant collapsible tube. Cure of the flowable organopolysiloxane was effected when the flowable mixture was applied onto a substrate under atmospheric conditions. In some instances it took several hours before the mixture attained a tack-free condition while in other situations the cure of the mixture was accompanied by an unpleasant amine odor or acid odor, such as acetic acid. In other situations, the moisture curable organopolysiloxane caused corrosion of metallic surfaces.

It would be desirable to overcome the aforementioned undesirable shortcomings of one-package room temperature vulcanizing organopolysiloxane compositions by providing a one-package organopolysiloxane composition capable of being converted from a flowable state to an elastomeric state upon exposure to atmospheric moisture to produce a tack-free elastomer within about one hour or less and cured organopolysiloxane elastomer within 24 hours without the generation of amine or acid by-products causing undesirable odor and metal contamination.

As shown in the copending application Ser. No. 927,289 of James A. Cella, filed concurrently herewith and assigned to the same assignee as the present invention, moisture curable compositions having terminal 1,3-dicarbonyl cyclic organosiloxy units of the formula,

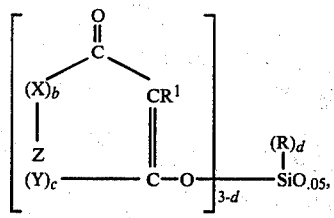

where R, $R^1$, X, Y and Z are defined below and d is equal to 0 or 1, have been found to be convertible to valuable organopolysiloxane elastomers without forming corrosive or foul smelling by-products. However, the usable work life of the moisture curable organopolysiloxane is often insufficient to utilize such curable organopolysiloxanes in a variety of applications.

STATEMENT OF THE INVENTION

The present invention is based on the discovery that certain alkoxysilylethers of 1,3-dicarbonyl cyclic silanes of the formula,

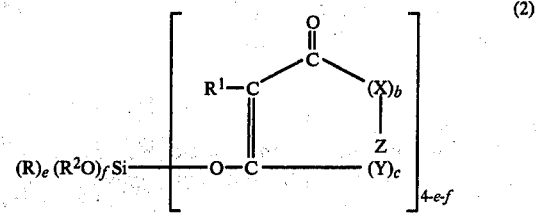

(2)

which are further described in our copending application Ser. No. 927,287, filed concurrently herewith and assigned to the same assignee as the present invention, can be employed in combination with silanol-terminated polydiorganosiloxane, to produce moisture curable organopolysiloxanes having terminal cyclic 1,3-dicarbonyl alkoxy siloxy units having improved work life, where R is a monovalent $C_{(1-13)}$ organic radical, $R^1$ is a monovalent radical selected from hydrogen, halogen and R, $R^2$ is a monovalent alkyl radical, X and Y are divalent radicals selected from —O—, —S— and

b and c are 0 or 1, Z is a divalent $C_{(1-13)}$ organic radical selected from alkylene, cycloalkylene, arylene and a fused ring structure, $R^3$ is a monovalent radical selected from hydrogen and R, e is equal to 0 or 1, f is an integer equal to 1 to 3 inclusive and the sum of e+f is equal to 1 to 3 inclusive.

Radicals included by R of formula (1) are, for example, aryl radicals and halogenated aryl radicals, such as phenyl, chlorophenyl, xylyl, tolyl, etc.; aralkyl radicals, such as phenylethyl, benzyl, etc.; alkyl and alkenyl radicals, such as methyl, ethyl, propyl, butyl, pentyl, vinyl, etc.; cycloalkyl, such as cyclopentyl, cyclohexyl, cycloheptyl, etc.; cyanoalkyl, such as cyanoethyl, cyanopropyl, etc.; fluoroalkyl, such as fluoropropyl, etc. Radicals included by $R^2$ are, for example, methyl, ethyl, propyl, butyl, pentyl, hexyl, heptyl, octyl. In formulas (1) and (2), where $R^2$ can represent more than one radical, these radicals can be the same or different.

The curable organopolysiloxane compositions of the present invention consist essentially of chemically combined units of formula (1), and have terminal 1,3-dicarbonyl cyclic alkoxysiloxy units of the formula,

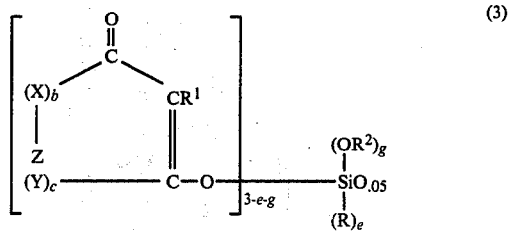

(3)

where R, R¹, R², X, Y, Z and e are as previously defined, g is equal to 1 or 2, and the sum of e+g is equal to 1 or 2, can be made by employing the 1,3-dicarbonyl cyclic alkoxysilanes of formula (2) with silanol terminated organopolysiloxanes of the formula,

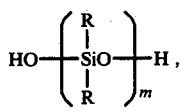
(4)

where m is an integer having an average value of to about 5-3000 inclusive.

There are included by the 1,3-dicarbonyl alkoxycyclic silanes of formula (2), compounds such as

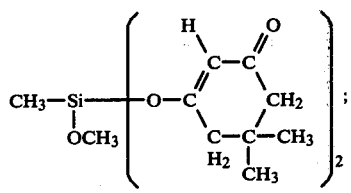

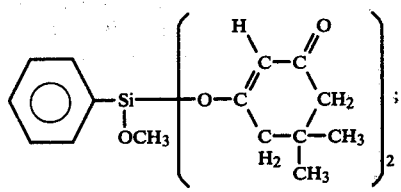

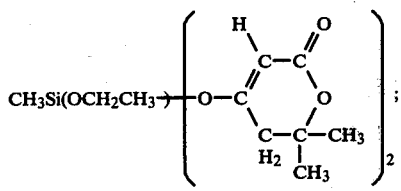

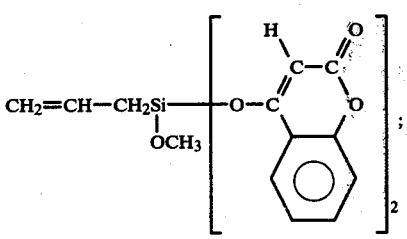

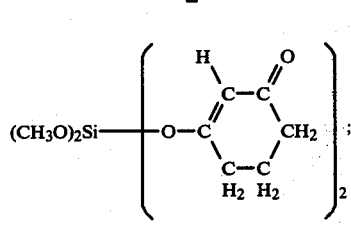

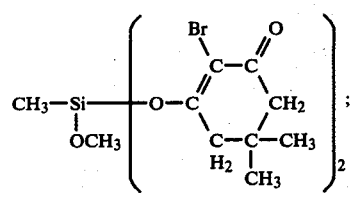

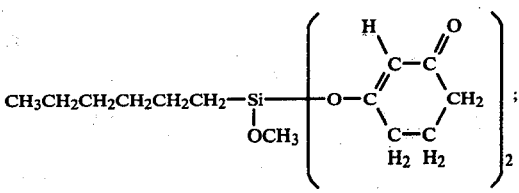

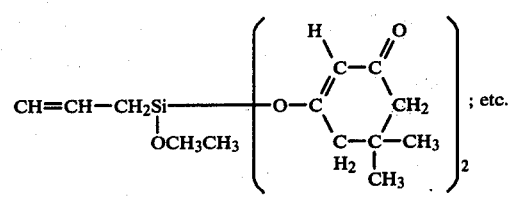

As described in our copending application Ser. No. 927,287, 1,3-dicarbonyl cyclic alkoxysilanes within formula (2) can be made by effecting reaction between an aliphatic alcohol of the formula, $$R^2OH, \quad (5)$$

an organohalosilane of the formula, $$(R)_eSiQ_{4-e}, \quad (6)$$

and a 1,3-dicarbonyl compound of the formula,

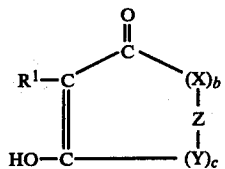
(7)

in the presence of an acid acceptor, where R, R¹, X, Z, Y, b, c and e are as previously defined and Q is a halogen radical such as chloro.

Silanol-terminated organo polysiloxanes of formula (4) preferably have a viscosity in the range of from about 2000 to 50,000 centipoises when measured at 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated diorganopolysiloxane of formula (3) are well known. For example, hydrolysis of diorganohalosilane such as dimethyldichlorosilane, diphenyldichlorosilane, methylvinyldichlorosilane, etc., or mixtures thereof can provide for the production of low molecular weight hydrolyzate. Equilibration thereafter can provide for higher molecular weight organopolysiloxane. Equilibration of cyclopolysiloxane such as hexamethylcyclotrisiloxane, octamethylcyclotetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined units of formula (1) with steam under pressure. Other methods that can be employed to make silanol-terminated organopolysiloxanes are more particularly described in U.S. Pat. No. 2,607,792, Warrick, and U.K. Pat. No. 835,790.

Various fillers and pigments can be incorporated in the silanol-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, etc. The amounts of filler used can obviously be varied within wide limits in accordance with the intended use. For example, in some sealant applications, the curable compositions of the present invention can be used free of filler. In other applications, such as the employment of the curable composition for making binding material, such as 700 parts or more of filler, per 100 parts of organopolysiloxane can be employed. In such applications, the filler can consist of a major amount of extending materials, such as ground quartz, polyvinylchloride, etc., or mixtures thereof, preferably having an average particle size in the range of from about 1 to 10 microns. The compositions of the present invention also can be employed as construction sealants, caulking compounds, etc. The exact amount of filler therefore will depend upon such factors as the application for which the organosiloxane composition is intended, the type of filler utilized (that is, the density of the filler, its particle size, ect.). Preferably, a proportion of from 10 to 300 parts of filler, which can include up to about 35 parts of a reinforcing filler, such as fumed silica filler, per 100 parts of silanol-terminated organopolysiloxane compositions of the present invention also can contain curing accelerators such as dibutyltindilaurate, carboxylic acid, salts of lead or zinc, etc.

In the practice of the invention, the curable organopolysiloxane compositions of the present invention can be made by mixing 0.5 to 50 parts of the alkoxysilyl ether of formula (2) per 100 parts of the silanol-terminated organopolysiloxane, etc., under substantially anhydrous conditions. The order of addition of the various ingredients is not critical. For example, the curing agent can be mixed directly with the silanol-terminated organopolysiloxane, followed by the addition of filler, or the curing agent can be added to the mixture of filler and the silanol-terminated organopolysiloxane, etc. Optimum results have been achieved, if the resulting mixture has not more than 100 parts of water, per million parts of mixture. Preferably, mixing is accomplished at a temperature between 20° C. to 80° C.

After the curable organopolysiloxane composition is made, it can be stored for a substantial period of time if properly protected from moisture. The curable organopolysiloxane composition can remain in a fluid curable state for periods of two years or more if maintained at temperatures to 60° C. under substantially anhydrous conditions.

In order that those skilled in the art will be better able to practice the invention, the following examples are given by way of illustration and not by way of limitation. All parts are by weight.

EXAMPLE 1

There was added 21.62 parts of anhydrous methanol to 100 parts of methyltrichlorosilane which was stirring under nitrogen. After hydrogen chloride evolution had ceased, 72.5 parts of the resulting clear solution was added dropwise to a stirred solution of 140 parts of 5,5-dimethyl-1,3-cyclohexanedione, 160 parts of triethylamine and 2400 parts of dry benzene.

The mixture was then filtered to remove triethylamine hydrochloride and the filtrate was stripped of solvent. There was obtained 182 parts of methylmethoxy bis-5,5-dimethylcyclohexane-1-one-3-yloxysilane having the formula,

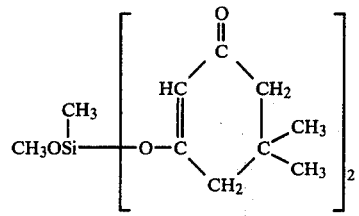

The identity of the 1,3-dicarbonylsilane was confirmed by its NMR spectrum.

A blend of 4 parts of the above 1,3-dicarbonylsilane, 100 parts of silanol terminated polydimethylsiloxane having a viscosity of about 35,000 centipoises at 25° C., 20 parts of fumed silica and 0.05 part of dibutyltindilaurate is mixed under substantially anhydrous conditions. A tack-free substantially odorless elastomer is formed in about one hour. A complete cure is achieved in about 20 hours under atmospheric conditions.

EXAMPLE 2

The procedure of Example 1 was repeated, except that a variety of aliphatic alcohols were used in combination with methyltrichlorosilane and 5,5-dimethyl-1,3-cyclohexanedione to produce a variety of alkoxy-substituted 1,3-dicarbonylsilanes. In instances where methanol was used as the aliphatic alcohol, the proportion of mols of methanol per mol of the methyltrichlorosilane was varied to produce methoxy-substituted silanes having a range of from about 0.3 to 1 mol of methoxy radicals per mol of the resulting 1,3-dicarbonylsilane. In instances where higher aliphatic alcohols were used, up to about 1 mol of alkoxy per mol of silane was used.

Moisture curable mixtures were then prepared following the procedure of Example 1 with each of the above-described alkoxy-substituted 1,3-dicarbonylsilanes to determine the effect of alkoxy-substitution on the terminal siloxy units in the respective polydimethylsiloxane moisture curable formulations and the length of the alkyl radical of the alkoxy radical with respect to the length of time required for forming a skin on the surface of the exposed moisture curable organopolysiloxane compositions or "work life". In addition, the tack-free time of the respective moisture curable organopolysiloxane compositions was also determined. All of the moisture curable organopolysiloxane compositions were examined while in aluminum cups which were exposed to atmospheric conditions. A moisture curable organopolysiloxane composition having terminal siloxy units substituted with 1,3-dicarbonyl silyl ether radicals free of alkoxy radicals was also evaluated.

The following results were obtained where "alcohol" represents the alcohol used in preparing the 1,3-dicarbonylsilane, and "mols" represents the mols of alcohol per mol of methyltrichlorosilane utilized.

| Alcohol | Mols | Work Life (min) | Tack Free Time (min) |
|---|---|---|---|
| — | 0 | 0.5–1.0 | 3–5 |
| methanol | 0.3 | 5 | 3 |
| methanol | 0.5 | 5 | 30 |
| methanol | 1.0 | — | 40 |
| ethanol | 1.0 | 60–120 | — |
| propanol | 1.0 | " | — |
| isopropanol | 1.0 | " | — |

The above results show that 1,3-dicarbonylsilanes substituted with alkoxy radicals are capable of extending the worklife of moisture curable organopolysiloxane compositions as compared to 1,3-dicarbonylsilanes free of alkoxy radicals. In addition, the length of the alkyl group on the aliphatic alcohol also influences the cure characteristics of the resulting moisture curable organopolysiloxane composition having terminal alkoxy-substituted siloxy units.

EXAMPLE 3

In accordance with the procedure of Example 1, a mixture of 31.1 parts of ethanol, 100 parts of methyltrichlorosilane, 190.4 parts of 5,5-dimethyl-1,3-cyclohexanedione, 141.4 parts of triethylamine and about 3,000 parts of toluene was employed to produce an ethoxy 1,3-dicarbonylsilane having the formula,

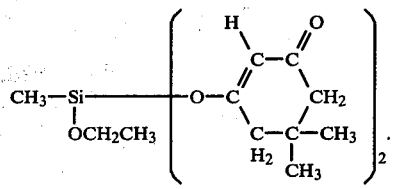

The above ethoxy-substituted silane was utilized with a silanol-terminated polydimethylsiloxane in accordance with Example 1 and there was obtained a moisture curable organopolysiloxane composition convertible to the solid elastomeric state upon exposure under atmospheric conditions.

Although the above examples are directed to only a few of the very many variables included within the scope of the present invention, it should be understood that the present invention is directed to a much broader variety of moisture curable compositions based on the use of 1,3-dicarbonyl cyclic alkoxy silanes of formula (2) and silanol terminated organopolysiloxanes of formula (4). In copending applications Ser. No. 796,017, filed May 11, 1977 now U.S. Pat. No. 4,115,514 and Ser. No. 927,288 filed concurrently herewith of Cella et al, there is shown the synthesis of 1,3-dicarbonyl cyclic silanes and the use of these silanes with silanol-terminated organopolysiloxane to produce moisture curable organopolysiloxanes having improved cure characteristics.

What I claim as new and desire to secure by Letters Patent of the United States is:

1. Moisture curable organopolysiloxane compositions comprising an organopolysiloxane consisting essentially of chemically combined units of the formula,

and having terminal alkoxysiloxy units of the formula,

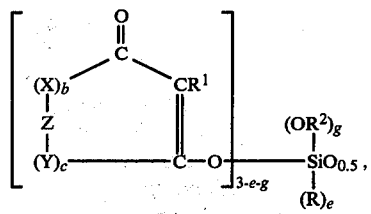

where R is a $C_{(1-13)}$ monovalent organic radical, $R^1$ is selected from hydrogen, halogen and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2.

2. A composition in accordance with claim 1, where the organopolysiloxane is a polydimethylsiloxane.

3. A moisture curable organopolysiloxane composition in accordance with claim 1, reinforced with a silica filler.

4. A moisture curable organopolysiloxane composition in accordance with claim 1 having terminal alkoxysiloxy units of the formula

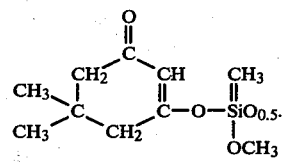

5. A moisture curable organopolysiloxane composition in accordance with claim 1 having terminal alkoxysiloxy units of the formula

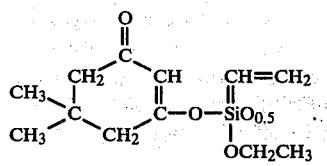

* * * * *